(12) United States Patent
Bhate et al.

(10) Patent No.: US 11,663,815 B2
(45) Date of Patent: May 30, 2023

(54) SYSTEM AND METHOD FOR INSPECTION OF HEAT RECOVERY STEAM GENERATOR

(71) Applicant: Infosys Limited, Bangalore (IN)

(72) Inventors: Ujwal Bhate, Pune (IN); Ninad Kulkarni, Mumbai (IN); Shaurya Dwivedi, Kanpur Dehat (IN)

(73) Assignee: INFOSYS LIMITED, Bangalore (IN)

( * ) Notice: Subject to any disclaimer, the term of this patent is extended or adjusted under 35 U.S.C. 154(b) by 142 days.

(21) Appl. No.: 17/191,338

(22) Filed: Mar. 3, 2021

(65) Prior Publication Data

US 2021/0304400 A1    Sep. 30, 2021

(30) Foreign Application Priority Data

Mar. 27, 2020   (IN) .............................. 202041013421

(51) Int. Cl.
  *G06T 7/00* (2017.01)
  *G06K 9/62* (2022.01)
  *G06V 10/94* (2022.01)

(52) U.S. Cl.
  CPC .......... *G06T 7/0008* (2013.01); *G06K 9/6257* (2013.01); *G06K 9/6262* (2013.01); *G06K 9/6269* (2013.01); *G06V 10/95* (2022.01); *G06V 10/955* (2022.01); *G06T 2207/10016* (2013.01); *G06T 2207/20081* (2013.01); *G06T 2207/20084* (2013.01); *G06T 2207/30136* (2013.01); *G06V 2201/06* (2022.01)

(58) Field of Classification Search
  None
  See application file for complete search history.

(56) References Cited

U.S. PATENT DOCUMENTS

| 2020/0158592 A1* | 5/2020 | Sivarkkamani | ....... G01M 3/002 |
| 2020/0231109 A1* | 7/2020 | Baitaxe | ................ G05D 1/0088 |
| 2020/0394784 A1* | 12/2020 | Toth | ....................... G06T 7/0004 |

OTHER PUBLICATIONS

Kaila, Gaurav, "How to Easily do Object Detection on Drone Imagery Using Deep Learning," Jun. 6, 2018, https://medium.com/nanoriets/how-we-flew-a-drone-to-monitor-construction-projects-in-africa-using-deep-learning-b792f5c9c471.

"Automated Defect Inspection Using Deep Learning," RSIP Vision, https://www.rsipvision.com/automated-defect-inspection-using-deep-learning/, last accessed Dec. 14, 2020.

(Continued)

*Primary Examiner* — Vikkram Bali
(74) *Attorney, Agent, or Firm* — Troutman Pepper Hamilton Sanders LLP (Rochester)

(57) ABSTRACT

Examples of the present invention provides a method and system for inspection of heat recovery steam generator (HRSG) equipment to identify defects and damages using computer vision and deep learning techniques. The method comprising capturing one or more input frames by one or more input devices, classifying the one or more input frames by a scenario classifier to identify a scenario type based on a first modelled data prepared by training one or more deep neural networks (DNN), selecting at least one damage detector based on the identified scenario type, identifying one or more damage types by the at least one damage detector based on second modelled data prepared by training the one or more DNN and displaying one or more output frame indicating the identified one or more damage types of the HRSG equipment.

20 Claims, 7 Drawing Sheets

(56) References Cited

OTHER PUBLICATIONS

Shaikh, Faizan, "Essentials of Deep Learning: Exploring Unsupervised Deep Learning Algorithms for Computer Vision," Jun. 7, 2018, https://www.analyticsvidhya.com/blog/2018/06/unsupervised-deep-learning-computer-vision/.

* cited by examiner

SYSTEM AND METHOD FOR INSPECTION OF HEAT RECOVERY STEAM GENERATOR

This application claims the benefit of Indian Patent Application Serial 202041013421, filed Mar. 27, 2020, which is hereby incorporated by reference in its entirety.

FIELD

This technology generally relates to inspection of heat recovery steam generator (HRSG). In particular, the present technique relates to a system and method for inspection of HRSG equipment to detect defects and damages using computer vision and deep learning technique.

BACKGROUND

A heat recovery steam generator (HRSG) is an energy recovery heat exchanger that recovers heat from a hot gas stream, such as a combustion turbine or waste gas stream. The HRSG produces steam, which drives a steam turbine. The HRSG requires regular inspection and occasional repairs to keep it functioning in a safe, efficient, and reliable manner. Currently, the HRSG inspections are done either annually by shutting down of the facility or by daily walkdown of the equipment to proactively search for potential problems. Visual inspections of HRSG reveals important details about the condition of components including damages, through-wall corrosion, fouling etc. Identifying the defects and damages based on the inspection of the HRSG equipment is important to save time and cost by minimizing repeated failures and protecting the long-term health of the unit.

The existing HRSG inspection techniques include either manual or semi-automated methods. The manual inspections involve the HRSG-trained inspection engineers visiting every part of the HRSG equipment and inspecting for known physical defects such as missing or damaged baffles, rust, corrosion, etc. The inspection engineers generally carry with them a checklist of what to monitor, where to monitor, typical symptoms and signatures of each potential defect. The semi-automated inspection method includes using different sensors for detecting the different types of defects and damages. For example, ultrasonic probes are used for corrosion mapping, thermal cameras for identifying gas leaks in online inspection, etc. Few approaches involve using a visible light camera to capture video feed, but the video feeds are again inspected manually by subject matter experts to analyze and drawn inference from them. The existing methods are time consuming and subject matter experts take lot of time to analyze and draw inferences from the video feeds and images to identify the defects. In addition, the existing methods are expensive. Thus, there is a desire for a system and method for inspection of HRSG equipment to identity the defects and damages.

Hence, there is a need to overcome the above drawbacks and to develop a system and method for inspection of the HRSG.

SUMMARY

Examples of this technology provides a method and system for inspection of a heat recovery steam generator (HRSG) equipment. The method comprising receiving one or more input frames of the HRSG equipment captured by one or more input devices, classifying the one or more input frames by a scenario classifier to identify a scenario type based on a first modelled data prepared by training one or more deep neural networks (DNN), selecting at least one damage detector based on the identified scenario type, identifying one or more damage types by the at least one damage detector based on second modelled data prepared by training the one or more DNN and displaying by an output device, one or more output frame indicating the identified one or more damage types of the HRSG equipment.

Examples of the disclosure provides a system for inspection of HRSG equipment. The system comprises an input device for capturing one or more input frame. A scenario classifier classifies the one or more input frame to identify a scenario type based on the first modelled data prepared by training one or more deep neural networks (DNN). A computing device selects an at least one damage detector based on the identified scenario type. One or more damage detectors for identifying one or more damage types based second modelled data prepared by training one or more DNN and a output device for displaying the generated one or more output frames indicating the identified one or more damage types of the HRSG equipment.

The method, system or apparatus, and/or non-transitory computer readable storage medium disclosed herein may be implemented in any manner that achieves various aspects of this technology, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Examples are illustrated by way of example and not limitation in the figures of the accompanying drawings, in which like references indicate similar elements and in which.

Other features of the present examples will be apparent from the accompanying drawings and from the detailed description that follows.

DETAILED DESCRIPTION

Examples of this technology provide a method and system for inspection of a heat recovery steam generator (HRSG) equipment to identify a damage types based on computer vision and deep learning technique. The damage types are auto-detected by a trained deep learning models and displayed on a dashboard for further assessment. The damage types are detected in near real time. Subject matter experts are not required to actually visit the equipment parts and inspect, nor are they required to go through hours of video captured by drones to analyze in offline mode. The method is more efficient in terms of cost, effort and time of inspection than the manual inspection techniques currently used in the industry.

Figure 1:
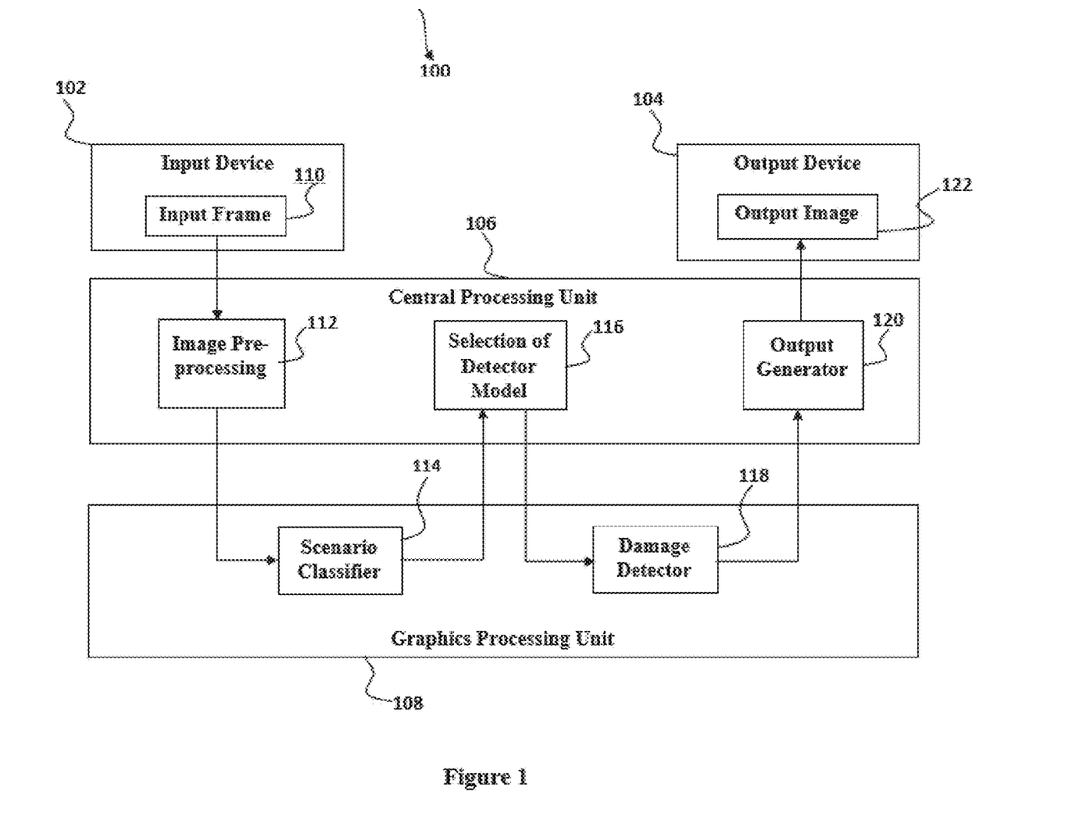
FIG. 1 is an example of a block diagram of a system for inspection of a heat recovery steam generator (HRSG) equipment.

FIG. 1 is an example of a block diagram illustrating the system 100 for inspection of the heat recovery steam generator (HRSG) equipment which may comprise one or more systems, devices, components or other elements which are coupled together within one system or operating in various configurations separately. In this example, the system 100 comprises an input device 102 for capturing an input frame 110 from the HRSG equipment. The input device 102 may include but not limited to drone, robots, cameras, unmanned aerial vehicles (UAV). The input frame 110 captured by the input device 102 is processed 112 by central processing unit 106. The input frame 110 is processed 112 to standardize the dimensions and normalizing the pixel value range. The standardization step changes the dimensions of the input frame 110 to pre-determined values since the input to a neural network should have the same dimensions during the training and inference phase. The normalizing step maps pixel values from the range [0, 255] to the range [−1, −1] as this is known to reduce the neural network training duration. The input frame 110 is a collection of one or more images and video feeds showing one or more components of the HRSG equipment.

A scenario classifier 114 generates the probability of the input frame 110 belonging to each scenario category based on the background environment within the input frame 110. The process of calculating the probability values for the input frame 110 is executed on a graphics processing unit (GPU) 108 to provide hardware acceleration for deep neural networks. Based on the set of probability values of the input frame 110 received from the scenario classifier 114, a central processing unit (CPU) 106 selects corresponding damage detector model 116 and send the input frame 110 to the damage detector 118. Consider for example, if there are 10 scenarios, the scenario classifier 114 will generate 10 probability values and the scenario corresponding to the highest probability value will be selected.

Figure 7:
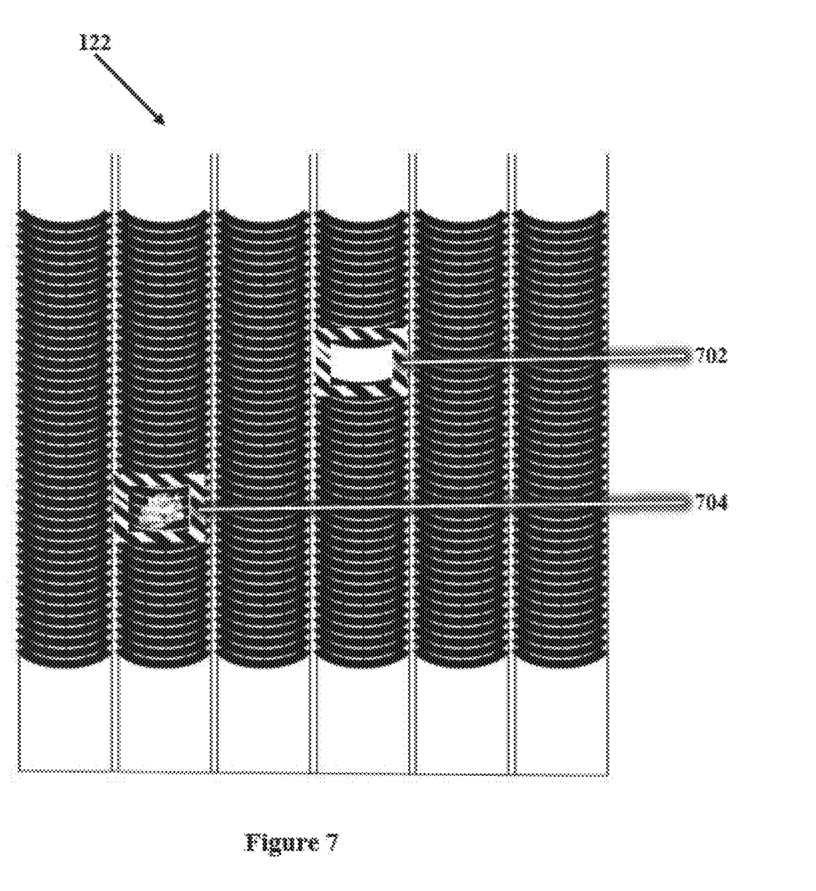
FIG. 7 is an example of an output image.

The damage detector 118 runs on the graphics processing unit (GPU) 108. The damage detector 118 identifies the defects and damages on the input frame 110. For each instance of the damage detected, the damage detector 118 outputs the location of the damage in terms of an bounding box 702 and 704 encoded by the co-ordinates (X, Y) of the enclosing box top-left corner, width (W), height (H) of the box and damage type. The co-ordinates and the damage type information is sent to output generator 120 to draw the bounding box 702 and 704 around each instance of the detected damage on the input frame 110. The final output image 122 is displayed on the output device 104, the output device 104 may be any image display equipment such as a monitor screen. The GPU according to the disclosure accelerates the processing of one or more deep neural network (DNN) components. The DNN is trained and executed on an edge-processing device located on an un-manned vehicle (UAV) for real-time processing.

Figure 2:
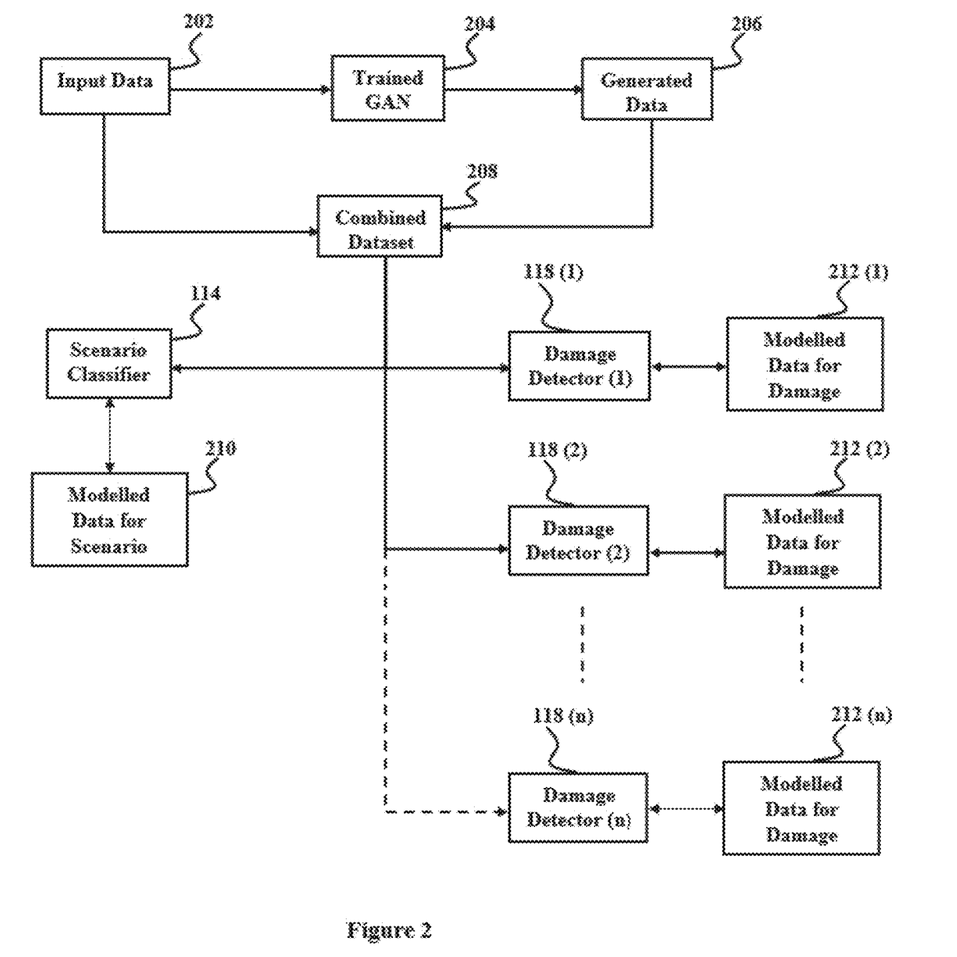
FIG. 2 is an example of a functional block diagram of training a deep neural network (DNN).

FIG. 2 is an example of a block diagram illustrating training deep neural network (DNN). Examples of this technology comprise the one or more DNN trained before deploying in the system 100. The input data 202 is a training dataset. The input data 202 is a collection of images showing various components of the HRSG equipment. The images of the HRSG equipment are captured using input deice 102 including but limited to one or more drone, robots, unmanned aerial vehicle (UAV).

The input device 102 capturing the inspection feed moves through various sections of the HRSG equipment. The HRSG equipment includes varied environments with different sets of components. Before applying the damage detection model 116, the trained deep learning model analyzes and classifies the background environment category through which the input device 102 is traversing. For example, if the input device 102 is inspecting a baffle area in the HRSG then it could be inspecting pipes, screws or support structures. It is not necessary to identify all kinds of defects or substrates. After identifying the sub-environment of the HRSG, the appropriate damage detector 118n is applied. Examples of this technology create multiple defects or damage detector model 116. The damage detection model 116 avoids the pitfalls of false positive detections arising from objects with similar features.

The number and nature of the various scenarios, which the scenario classifier 114 is trained to identify are defined manually prior to the training process. The images in the input data 202 are manually examined and divided into different groups based on similar characteristics such as the component being examined, viewing angle of the component surface and background or scene appearance. The images assigned to each group are categorized as a scenario type and accordingly the modelled data 210 is prepared. At a later stage, the respective image sets belonging to each group are used as modelled data 212(1, 2, . . . , n). The images from one group (say n) are used to train only one instance of the damage detector 118n, the modelled data 212 (n) is created by using this image set. Some examples of scenario types include but not limited to tubing, baffles, joints and screw fittings.

During training phase, the input data 202 is fed to a generative adversarial network (GAN) 204. The output of the trained GAN 204 is a generated data 206. The GAN 204 is a class of machine learning systems known in the industry. The input data 202 combined with the generated data 206 forms a combined dataset 208. The trained GAN 204 comprise two distinct networks known as a generator and a discriminator. The generator generates the HRSG equipment images and the discriminator evaluates whether the images are real or not. The generative adversarial network 204 learns a mapping from latent space to a particular data distribution of interest. The latent space is a low-dimensional space, the latent space represents the real-world information in a compressed form. According to present disclosure, the latent space representation is a list of floating point numbers and the generator learns to map these numbers to the images of the HRSG equipment.

The discriminator network discriminates between the real images and images produced by the generator. The objective of training the generator network is to increase the error rate of the discriminative network. The trained generator network creates realistic images. The real HRSG equipment images are input to the discriminator as the initial training dataset 202. Training the discriminator includes providing samples from the dataset and the synthetic images, until the image reaches accuracy level for discriminating between the two images. The generator is provided with a random input dataset 202 sampled from a predefined latent space or noise variables, which come from the multivariate normal distribution of the input dataset. The output generator then generates the synthetic images of the HRSG equipment. The synthetic images are input to the discriminator, to identify whether the image is original or the generated image. Based on the decision of the discriminator, the generator adjust its parameters to identify the real image.

A backpropagation algorithm is applied on both the generator and discriminator networks, so that the generator produces better images and the discriminator becomes more skilled at flagging the synthetic images. The DNN uses backpropagation for the training process. The combined dataset 208 comprises the original input dataset 202 which are the real images of HRSG equipment along with the synthetic images or generated data 206 of the HRSG equipment generated by the GAN 204. Consider that the original input dataset 202 comprises p images and the data generated by the GAN 204 is q images then the combined dataset 208 comprises the entire set of (p+q) images. The combined dataset 208 is split into a training set and a test set. The training set is used to train the scenario classifier 114 and damage detector 118, while the test set is used to ascertain their accuracy.

The input device 102 capturing the inspection feed moves through various sections of the HRSG equipment. The HRSG equipment includes different sets of components. Before applying the damage detector 118, the scenario classifier 114 is trained to analyze and classify the background environment through which the drone is traversing.

During the training phase, the modelled data 210 is prepared through a manual process for training the scenario classifier 114. This process entails a human operator examining the individual images in the training data and determining the expected output from the neural network for each image. The modelled data 210 is built based on the expected output and based on which the neural network is trained. The modelled data 210 comprises of a list of images selected from the combined dataset 208 and a scenario ID corresponding to each single image. To assign an appropriate scenario ID to every image, the entire set of images in the combined dataset 208 is examined. Through this manual process, the images are divided into n scenarios depending on their visual characteristics and physical location within the HRSG equipment. These n scenarios each are given a unique ID (1, 2, 3 . . . n). Thus, if the m images are selected from the combined dataset 208, then the modelled data 210 comprises a reference to m images and a list of m scenario IDs, where each ID is in the range [1, n]. The modelled data 210 is loaded in a tabular or text format on the GPU 108 and fed into the scenario classifier 114 during the training phase. Thus, the modelled data 210 for an image is received from the scenario classifier 114 if the same image was fed as input to the scenario classifier 114.

According to an example of the system, the scenario classifier 114 is a deep neural network classifier, it uses a convolutional neural network (CNN) architecture. It includes one or more CNN layers followed by one or more fully connected layers having n nodes in the final output layer, where n equals the number of scenarios. If an input frame 110 belongs to scenario with scenario ID 's', then the expected output from the final layer nodes of the neural network is $$node_i = \begin{cases} 0 & \text{if } i \neq s \\ 1 & \text{if } i = s \end{cases} \forall_{i \in \{1,2,\ldots,n\}}$$

The input frame 110 is fed to the first layer of the CNN architecture which acts as a feature extractor and the subsequent fully connected layers in the neural network perform the task of a decision maker in terms of determining which scenario that particular image belongs to. During the training phase, images of combined dataset 208 are provided as input to the CNN and the output is recorded. The corresponding modelled data 210 is set as the required output of the final layer of the neural network. A cross-entropy loss function is used to calculate the loss due to the difference between the required output (which is nothing but the modelled data) and the predicted output (which is calculated by the neural network in its present state).

$$CE \text{ Loss} = -\sum_{i=1}^{n} y_i \log(pred_i)$$

where, $n$ = number of nodes in the final output layer and is also number of scenarios $y_i$ = value of the node according to modelled data (either 0 or 1)

$pred_i$ = predicted value of the node by the network.

The neural network is essentially a network of interconnected nodes, where each node is referred to as a perceptron. The network can be divided into multiple layers (L). Any node in layer $L_i$ is connected to every node in layer $L_{i-1}$. Each of these connections has a corresponding floating point number called as the weight. The node at layer $L_i$ receives input from each node in layer $L_{i-1}$ multiplied by their corresponding weights and summed followed by the application of other mathematical operations resulting in a single numerical value which represents the output of that particular node. Thus, it can be seen that the weights of the neural network determine its final output. During the training phase, the above described cross entropy loss is used to calculate the error between the neural network's required output and actual output. The backpropagation algorithm is used to propagate this loss back to each node in the neural network including the nodes that form the CNN feature extractor. This algorithm is based on the concept of gradient descent which allows the neural network to tweak its weights by a small margin at every pass of the input in such a way that the neural network's output shifts closer to the required output determined by the modelled data 210. Through this neural network training process, the network continually learns to output values that are more accurate until it reaches a sufficient level of accuracy. According to an example, the system 100 is trained to identify the sub-section class of the input frame 110 by processing of the camera feed, localization of defects and multiple damage detection models. The scenario classifier 114 identifies the area within the HRSG equipment environment supplied by the camera feed in the input frame 110, and uses this identifying to select the detector model 116 and apply the corresponding damage detector 118n. By narrowing the scope of the damage detector model 116, the model becomes more efficient and avoid the pitfalls of false positive detections arising from objects with similar features. The system 100 achieves higher rates of precision and identifies the defect or damage detection scenario.

The scenario classifier 114 includes a deep convolutional neural network (CNN). The scenario classifier 114 identifies the sub-section of the image and classifies the image based on damage type. The damage detector 118 identifies and localizes the defective regions on the HRSG equipment. During the training phase, the modelled data 210 for scenario classifier 114 and the images of the combined dataset 208 are input to the scenario classifier 114 to generate the output.

During the training phase, a modelled data 212n for damage is prepared through a manual process for training the damage detector 118. This process entails a human operator examining the individual images in the training data and determining the expected output from the neural network for each image. The modelled data 210 is based on the expected output based on which the neural network is trained. An open source tools such as GNU Image Manipulation Program (GIMP) or LabelImg may be used to assist in this process. The modelled data 212n comprises of a list of images selected from the combined dataset 208 and a set of annotations corresponding to each image, which indicates the location of the damaged HRSG equipment within that particular image and also the type of damage. Every annotation may comprise five numerical components, a damage ID indicating the type of damage and four numbers, which encode the location of a bounding box encompassing the damaged region. These four numbers indicate the X and Y co-ordinates of the bounding box and the width and height of the bounding box with respect to the dimensions of that particular image. The modelled data 212n is loaded in a tabular or text format on the GPU 108 and fed into the damage detector 118 during the training phase. Thus, the modelled data 212n for the image encodes the ideal output which we receive from the damage detector 118 if the same image was fed as input to the damage detector 118.

According to an example of the system, if the analysis of the combined dataset 208 results in the denoting of n scenarios with IDs 1, 2, . . . n, then the system will comprise n damage detectors 118n with IDs 9(1), 9(2) . . . 9(n), with each instance of the damage detector corresponding to one particular scenario. To achieve this, the modelled data 210 of the scenario classifier 114 is utilized since it contains a scenario ID for each image. According to this scenario ID, the combined dataset 208, is divided into n sub-datasets where each sub-dataset only contains images from one corresponding scenario. For each instance of the damage detector 118(1, 2, . . . , n), the modelled data 212(1, 2, . . . , n) comprises images from the corresponding sub-dataset and the annotations prepared for each of those images. According to an example, the damage detector 118n is implemented as the DNN. The architecture and operational methodology of the damage detector 118n can be modified in accordance of the requirements such as type of defects, number of defects, time constraints for the system operation. The damage detector 118n may use the CNN based object detection framework such as single shot multi-box detector (SSD). The SSD framework uses the CNN to extract features from the input frame 110 and estimate the location of specified objects within the input frame 110. The object detection framework outputs the co-ordinates of the bounding box 702 and 704, which encloses the damaged HRSG components within the input frame 110 and a corresponding confidence score for each damage detected.

Each instance of the damage detector 118n contains the one DNN model constructed as per the architecture of the SSD framework. The model takes the input frame 110 for each location within the image, predicts the probability that an object of interest or damaged component is present at that location. If the damage detector 118n is trained to detect d distinct types of damaged components, then for each location in the image, the SSD model will output predictions d where each prediction comprises a confidence score and a corresponding set of co-ordinates (x, y, w, h) that define a bounding box. The damage detector 118n processes the output at each location and retains the prediction with the highest confidence for each location, resulting in one prediction for each location within the image. Following this, a confidence threshold filter is applied to all the remaining predictions, so that only the set of damage predictions d with the highest confidence measure is retained by the damage detector 118n. The bounding box co-ordinates and damage type information for each element in set d is the output of the damage detector 118n and sent to output generator 120.

An example of the system 100 uses a damage detector 118n that includes a CNN based pixel-segmentation approach. The CNN extracts features from the input frame 110 and assigns a probability value for each pixel indicating the class to which the pixel belongs. The class determines whether the particular pixel is a region of interest or damaged component and further identifies which class of damage is observed like corrosion, broken baffles, etc. The damage detector 118n may also use computer vision techniques to find the contour or boundary around such pixel regions indicating damaged components and then use contour to calculate the bounding rectangle region around the damaged HRSG component. During the training phase, the modelled data 212n for damage detection is provided to the damage detector 118n. The damage detector 118n is trained until it provides the exact output by comparing the desired output 212n and the calculated output. The modelled data 212n is an output of the neural network for a given input dataset 12.

According to an example, the disclosure may use the DNN to perform pixel segmentation as an alternative to the SSD framework within the damage detector 118n. The pixel segmentation architecture comprises a series of the CNN layers, specifically a set of convolution layers followed by a set of deconvolution layers. The convolution layers extract the features from the input image and output a compact representation of these features. The deconvolution layers expand this compact representation back into the original size of the image. With the pixel segmentation approach, the output of the DNN architecture is a multi-layer image representation, with the number of layers equals to (number of defect types+1). The value within each pixel of each layer represents the probability that the corresponding pixel in the input image is part of a component displaying the defect type corresponding to that particular layer.

The damage detector 118n processes this multi-layer representation to extract pixel locations of damaged components by retaining only the pixels with the highest probability values. The computer vision algorithms is applied to find the boundary, which traces the shape of each group of such pixels. The boundary is refined to form a bounding box around the group. Each such group represents a damaged component with bounding box co-ordinates (x, y, w, h).

An example of the system may, along with the bounding box co-ordinates also supply the output generator 120 with the precise pixel locations of the damaged components, allowing the output generator 120 to create a visual mask on top of the damaged component instead of the bounding box.

Figure 3:
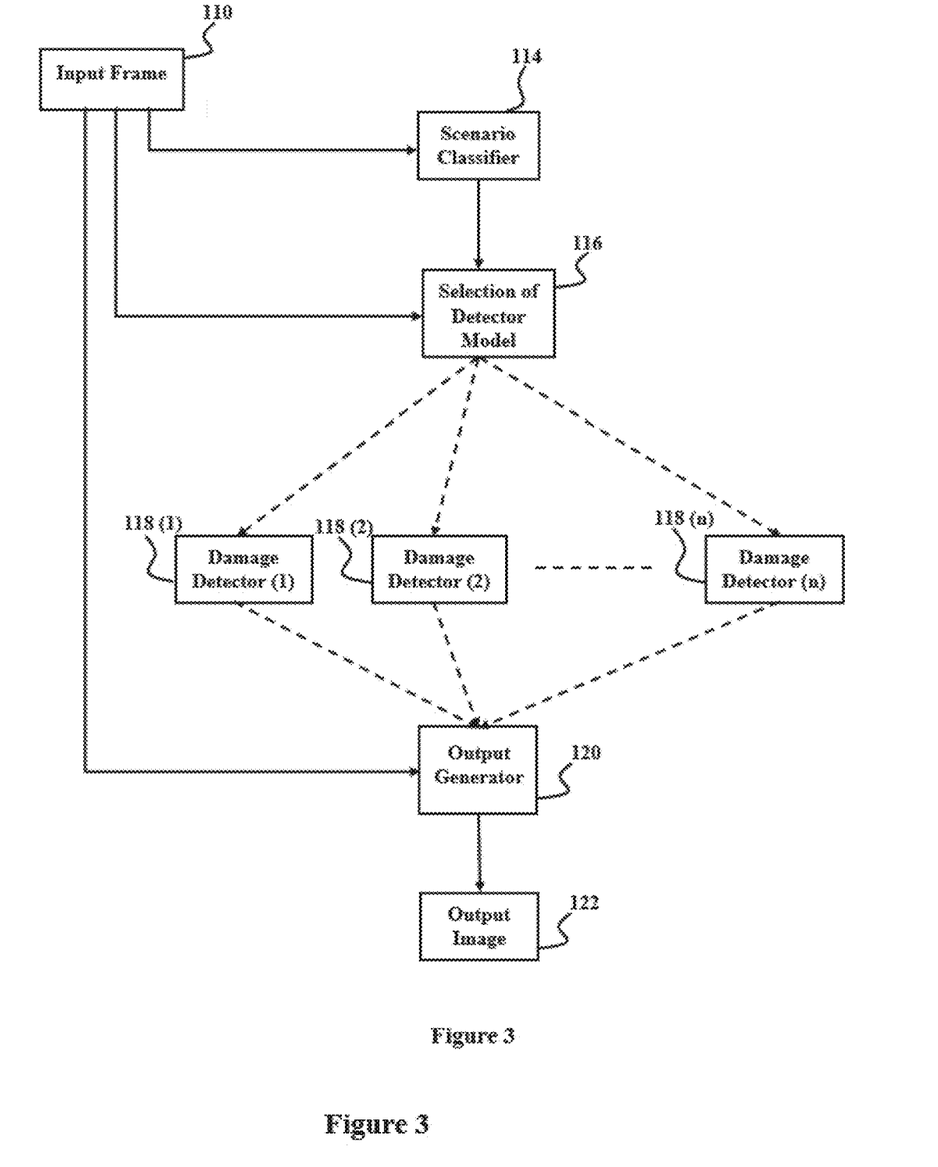
FIG. 3 is an example of a functional block diagram of an inspection of the HRSG equipment during inference or live phase.

FIG. 3 is an example of a block diagram illustrating an inspection of the HRSG equipment during inference or live phase. The input frame 110 includes an images extracted from a video feed to identify the damaged or defective components in the HRSG equipment. The previously trained model identifies the sub-environment region where the drone is located. The extracted input frame 110 is fed to detector model 116 for selection of damage detector 118n. The selected damage detector 118n predicts regions on the input frame 110 where the defects are present based on the previously learnt feature patterns. The selected damage detector 118n processes the input frame 110 and identifies the area within the frame that contains damaged components.

For selecting the correct damage detector model 116, the arg max function is used on the output of the scenario classifier 114. If any input frame 110 the scenario classifier 114 outputs a set of n probability values. Each value indicates the probability that the input frame 110 belongs to the corresponding scenario (1, 2, . . . , n). The arg max function returns the scenario ID whose probability value is the maximum. The selection of detector module 116 is then able to load the corresponding damage detector 118(1, 2, . . . , n). Consider the number of possible scenarios as n. The probability p(s) is the probability that input frame 110 belongs to the scenario s such that $$0 \leq p(s) \leq 1$$

$$1 \leq s \leq n$$

If p(s) is the largest probability value, then the arg max function output is given by:

$$\mathrm{Argmax}(p(0), p(1), \ldots, p(s), \ldots, p(n-1), p(n)) = s$$

where $p(s) > p(t) \forall t \in [1,n], t \neq s$

Thus, s is the scenario ID which has the highest probability for the given input frame 110 and the detector module 116 loads the damage selector 118n.

According to an example, the inference comprises the model trained during the training phase. The trained models retain the same architecture and operational methodology for generating the required output. During the inference phase, the scenario classifier 114 processes the input frame 110 and generates the output indicating the sub-section of the HRSG equipment to which the input frame belongs. The selection of detector model 116 includes selecting the precise damage detector 118n based on the background environment. The damage detector 118n processes the input frame 110 and generates the output including the image coordinates of the enclosing boxes for each detected damaged structure and the damage type present within the corresponding bounding box 702 and 704. The output generator 120 uses the output of the damage detector 118 to draw a bounding box 702 and 704 for each instance of the detected damage on the input frame 110. The co-ordinates and damage type are the outputs of the neural network that forms the damage detector 118n. The co-ordinate and damage type information is sent to output generator 120 to draw the bounding box 702 and 704 around each instance of the detected damage of the input frame 110. The final output image 122 is displayed on the output device 104. the output device 104 may be any image display equipment such as a monitor screen.

The types of defects inspected includes rusting, corrosion, erosion of surfaces, cracks, broken joints, missing screws, loose screws, build-up of deposits. The typical damages include missing fins, broken fins, partially damaged fins, broken structures, broken pipes, etc.

Figure 4:
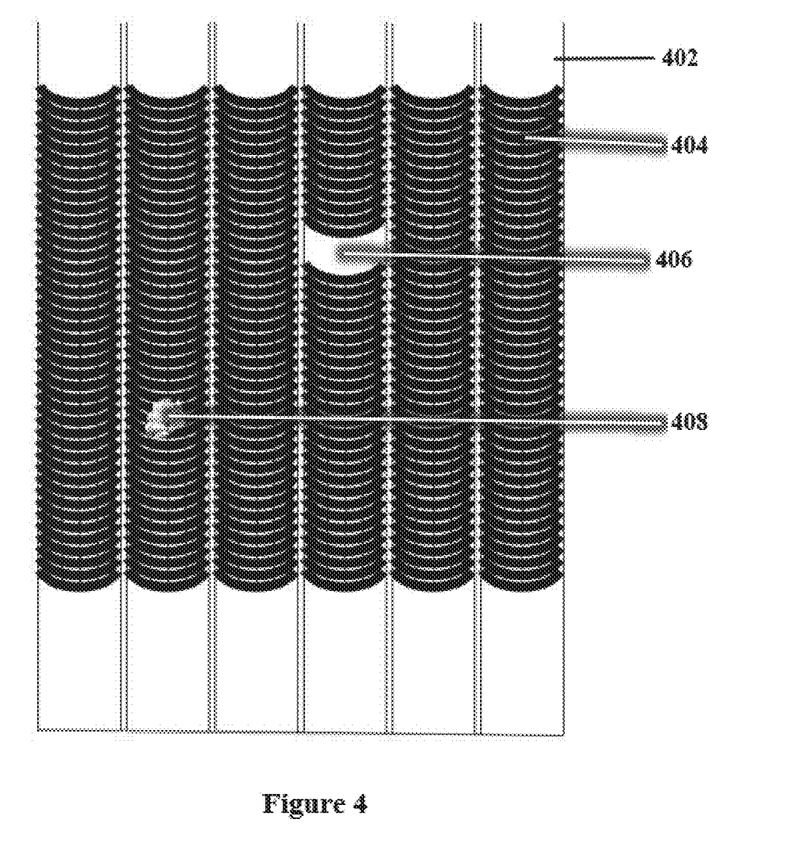
FIG. 4 is an example of an input frame for identifying defects and damages in HRSG equipment.

FIG. 4 is an example of an input frame 110 for identifying the defects and damages in HRSG equipment, according to an example. The input frame 110 shows the inspection of HRSG baffle 402 area with missing fins 406 and damaged fins 408 within HRSG boiler. The baffles are tubes with fins 404 to enable heat dissipation in HRSG. The input device 102 captures the images or video feed of the baffle sections. The images or video feeds captured by input device 102 or unmanned aerial vehicle or drones are analyzed by trained deep neural network to identify the defects and damages.

The deep learning and computer vision based technique, according to present disclosure automates the HRSG inspection process. A detailed summary report is prepared to list all the defects identified during overall inspection along with location and time of the inspection.

Figure 5:
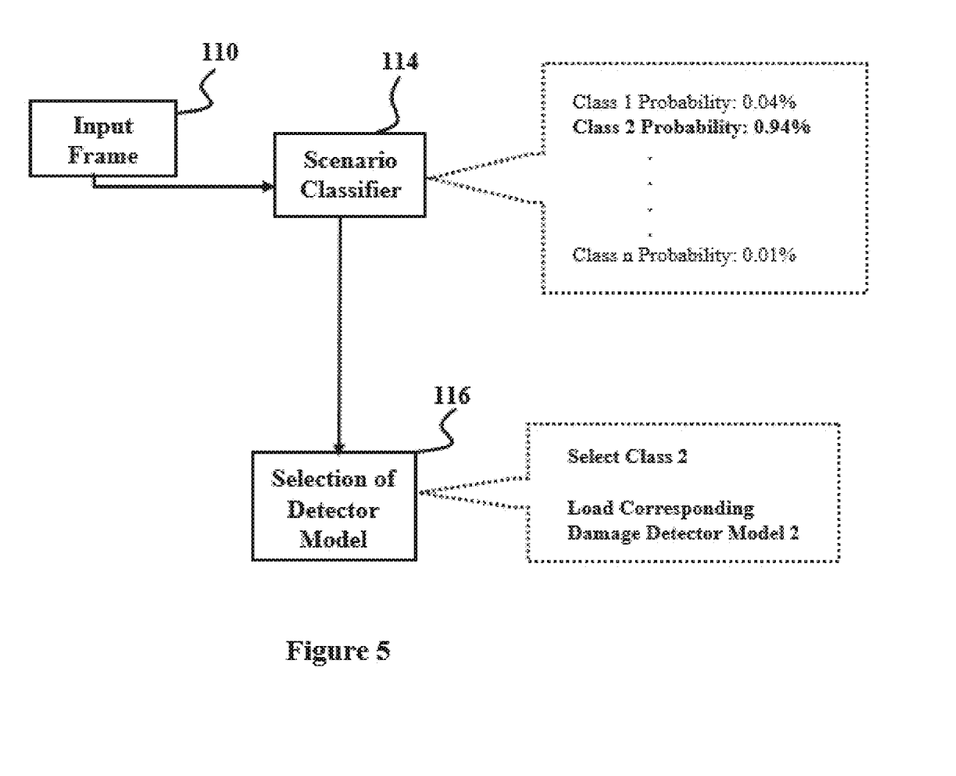
FIG. 5 is an example of a block diagram illustrating an output of scenario classifier.

FIG. 5 is an example of a block diagram illustrating an output of scenario classifier 114. The scenario classifier 114 generates the probability of the input frame 110 belonging to a particular scenario category based on the background environment within the input frame 110. As shown in FIG. 5, a class 1, class 2 to class n probability of the input image are generated based on the background environment of the input frame 110. The process for calculating the set of probability values of the input frame 110 is executed on the GPU 108 of the computing device to provide hardware acceleration for deep neural networks. Based on the probability of the input frame 110 received from the scenario classifier 114, the CPU 106 of the computing device selects the corresponding damage detector model 116 and send the input frame 110 to damage detector 118n. As shown in FIG. 5, class 2 with probability 0.94% selected by the CPU 106 and the corresponding damage detector model 116 is loaded to identify the defects or damages on the input frame 110. The damage detector 118 runs on the GPU 108.

Figure 6:
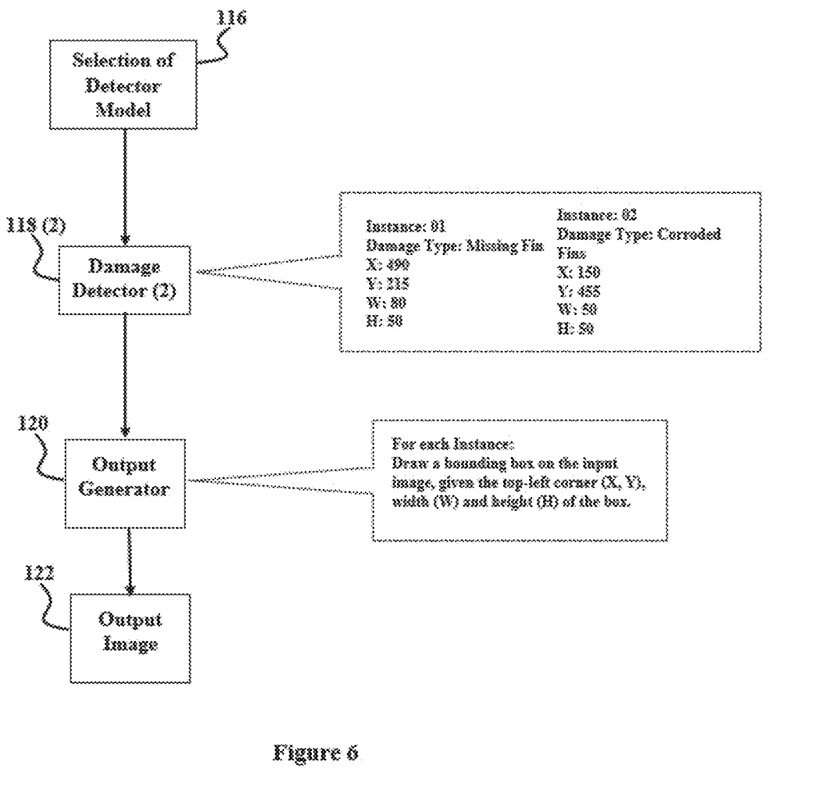
FIG. 6 is an example of a block diagram illustrating an output of damage detector and output generator.

FIG. 6 is an example of a block diagram illustrating the output of damage detector 118n and output generator 120. For each instance of the damage detected, the damage detector 118n outputs the location of the damage in terms of an enclosing box or bounding 702 and 704 encoded by the co-ordinates (X, Y) of the box's top-left corner and the width (W) and height (H) of the box and the damage type or category. FIG. 6 shows two instances instance 1 and instance 2 of the damage detector. The instance 01 indicates the damage type missing fins with co-ordinate X: 490, Y: 215, W: 80 and H: 50 and the instance 02 indicates the damage type corroded fins with co-ordinates X: 150, Y: 455, W: 50 and H: 50. The co-ordinate and damage type information is sent to output generator 120 to draw the bounding box 702 and 704 around each instance of detected damage of the input frame 110. The final output image 122 is displayed on the output device 104 such as a monitor screen.

According to an example, the damage detector 118n is implemented as the DNN. The architecture and operational methodology of the damage detector 118n can be modified based on the type of defects, number of defects, time constraints for the system operation. The damage detector 118n may use the CNN based object detection framework such as the single shot multi-box detector (SSD). The SSD framework uses the CNNs to extract features from the input frame 110 and estimate the location of specified objects within the input frame 110. The object detection framework outputs the co-ordinates of the bounding box, which encloses the damaged HRSG components within the image frame that have been detected and a corresponding confidence score for each detection.

According to an example, the damage detector 118n may include the CNN based pixel-segmentation approach. The CNN extracts features from the input image frame 110 and assigns a probability value for each pixel indicating the class to which the pixel belongs. The class determines whether the particular pixel is a region of interest or not and identifies which class of damage is observed like corrosion, broken baffles, etc. The damage detector 118n uses the computer vision technique to find a contour or boundary around the pixel regions indicating the damaged components and to calculate the bounding rectangle region around the damaged HRSG component.

FIG. 7 is an example of an output image 122. The output generator 120 draws the bounding box 702 and 704 around each instance of detected damage of the input frame 110. The final output image 122 is displayed on the output device 104, the output device 104 may be any image display equipment such as a monitor screen.

According to an example, the system and method for inspection of HRSG equipment extracts and learns the defects and damages more accurately using deep learning based models. The defects are auto-detected by trained deep learning models and presented to experts on the dashboard for further assessment. The defects and damages are detected in near real time and are faster. Hence, subject matter experts are not required to actually visit the equipment parts and inspect, nor are they required to go through hours of video captured by drones in offline mode and analyze.

The system and method of examples of this technology are cost effective and the cameras are much cheaper in comparison to overall inspection equipment costs and other ultrasonic based approaches. Even in scenarios where the images are processed offline, these deep neural models are much faster than team of specialists going through the entire feed and drawing inferences. It takes less downtime and overcomes data sufficiency challenges for effective modeling of defects and damages. The method uses adversarial deep learning algorithms to synthesize images of damaged components, and uses them in augmenting the training model along with historical data, to make it robust and increase its accuracy.

Although the present examples have been described with reference to specific examples, it will be evident that various modifications and changes may be made to these examples without departing from the broader spirit and scope of the various examples. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Various operations discussed above may be tangibly embodied on a medium readable through one or more processors. These input and output operations may be performed by a processor. The medium readable through the one or more processors may be, for example, a memory, a transportable medium such as a CD, a DVD, a Blu-Ray™ disc, a floppy disk, or a diskette. A computer program embodying the aspects of the exemplary examples may be loaded onto the one or more processors. The computer program is not limited to specific examples discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A method for inspection of a heat recovery steam generator (HRSG) equipment, the method comprising:
   receiving, by a computing device, an input frame captured of the HRSG equipment, wherein:
     an input dataset that comprises images of the HRSG equipment captured by an input device is fed to a generative adversarial network (GAN),
     an output of the GAN for the fed input dataset is a synthetic dataset,
     a combined dataset is generated based on the input dataset and the synthetic dataset,
     first modelled data and second modelled data are prepared from the combined dataset and loaded into a graphics processing unit (GPU) for training a scenario classifier and a plurality of damage detectors, respectively,
     the scenario classifier is a neural network trained, based on the first modelled data, to identify a plurality of scenario types in input frames of the HRSG equipment, and
     the plurality of damage detectors are neural networks trained, based on the second modelled data, to identify damages to the HRSG equipment and damage types of the damages;
   classifying, by the computing device, the input frame to identify a first scenario type of the plurality of scenario types based on an output of the trained scenario classifier for the input frame;
   selecting, by the computing device, a first damage detector, of the plurality of damage detectors, for identification of damage to the HRSG equipment, based on the identified first scenario type;
   identifying, by the computing device, an instance of damage to the HRSG equipment and a damage type of the instance of damage based on an output of the selected first damage detector for the input frame; and
   providing, by the computing device, an output frame, indicating the instance of damage to the HRSG equipment and the identified damage type, to an output device for display, wherein the output frame is displayed on the output device.

2. The method according to claim 1, further comprising processing, by the computing device, the input frame, wherein the processing of the input frame comprises standardizing an image dimensions and normalizing a pixel value range of the input frame.

3. The method according to claim 1, wherein the GAN comprises:
   a generator for generating the synthetic dataset; and
   a discriminator for evaluating the synthetic dataset by discriminating the input dataset with the synthetic dataset.

4. The method according to claim 1, wherein the first modelled data comprises a list of images selected from the combined dataset and a scenario ID corresponding to each of the list of images.

5. The method according to claim 1, wherein the second modelled data comprises a list of images selected from the combined dataset and a set of annotations for each of the list of images, wherein the set of annotations for each of the list of images comprises a damage ID indicative of a type of damage to the HRSG equipment in a corresponding image, coordinates of a bounding box encompassing the damage to the HRSG, and a width and a height of the bounding box.

6. The method according to claim 1, wherein the input dataset and the input frame comprises images and video feeds of one or more components of the HRSG equipment.

7. The method according to claim 1, wherein the scenario types comprises tubing, baffles, joint, and screw fittings present in the HRSG equipment.

8. The method according to claim 1, wherein the one or more damage types comprises missing baffles, damaged baffles, rust, or erosion, present in the HRSG equipment.

9. The method according to claim 1, wherein the output of the scenario classifier comprises a set of probability values indicative of a probability of the input frame belonging to each of the scenario types, wherein the first scenario type is identified based on the set of probability values.

10. The method according to claim 1, wherein the each of the damage detectors comprises a single shot multi-box detector (SSD) for localizing a damaged HRSG component within the set of input frames.

11. The method according to claim 1, wherein each of the damage detectors is a CNN based pixel-segmentation neural network for localizing a damaged HRSG component within the input frame.

12. The method according to claim 1, wherein the output of the first damage detector comprises coordinates of the one or more damage type based on the output of one or more deep learning models.

13. A system for inspection of heat recovery steam generator (HRSG) equipment, comprising:
an input device for capturing input frames of the HRSG equipment;
a computing device configured to:
  receive an input frame of the HRSG equipment captured by the input device, wherein:
    an input dataset that comprises images of the HRSG equipment captured by the input device is fed to a generative adversarial network (GAN),
    an output of the GAN for the fed input dataset is a synthetic dataset,
    a combined dataset is generated based on input dataset and the synthetic dataset,
    first modelled data and second modelled data are prepared from the combined dataset and loaded into a graphics processing unit (GPU) for training a scenario classifier and a plurality of damage detectors, respectively,
    the scenario classifier is a neural network trained, based on the first modelled data, to identify a plurality of scenario types in input frames of the HRSG equipment, and
    the plurality of damage detectors are neural networks trained, based on the second modelled data, to identify damages to the HRSG equipment and damage types of the damages;
  classify the input frame to identify a first scenario type of the plurality of scenario types based on an output of the trained scenario classifier for the input frame;
  select, a first damage detector, of the trained plurality of damage detectors, for identification of damage to the HRSG equipment, based on the identification of the first scenario type; and
  identify an instance of damage to the HRSG equipment and a damage type of the instance of damage based on an output of the selected first damage detector for the input frame, and
an output device configured to display an output frame indicating the identified instance of damage to the HRSG equipment and the identified damage type.

14. The system according to claim 13, wherein the computing device is further configured to process the input frame for standardizing dimensions and normalizing a pixel value range of the input frame.

15. The system according to claim 13, wherein the GAN, comprises:
a generator for generating the synthetic dataset; and
a discriminator for evaluating the images by discriminating the input dataset with the synthetic dataset.

16. The system according to claim 13, wherein the input dataset and the input frame comprises one or more images or video feeds of one or more components of the HRSG equipment.

17. The system according to claim 13, wherein the output of the scenario classifier comprises a set of probability values indicative of a probability of the input frame belonging to each of the plurality of scenario types, wherein the first scenario type is identified based on the set of probability values.

18. The system according to claim 13, wherein each of the damage detectors comprises a single shot multi-box detector (SSD) for localizing a damaged HRSG component within the input frame.

19. The system according to claim 13, wherein each of the damage detectors is a CNN based pixel-segmentation neural network for localizing a damaged HRSG component within the input frame.

20. The system according to claim 13, wherein the output of the first damage detector comprises coordinates of the damage and the damage type.

* * * * *